S. G. MALBY.
WHEEL AND ITS MANUFACTURE.
APPLICATION FILED JULY 17, 1916.

1,255,195.

Patented Feb. 5, 1918.
2 SHEETS—SHEET 1.

Inventor
Seth G. Malby
By his Attorney
Henry D. Williams

S. G. MALBY.
WHEEL AND ITS MANUFACTURE.
APPLICATION FILED JULY 17, 1916.
1,255,195.
Patented Feb. 5, 1918.
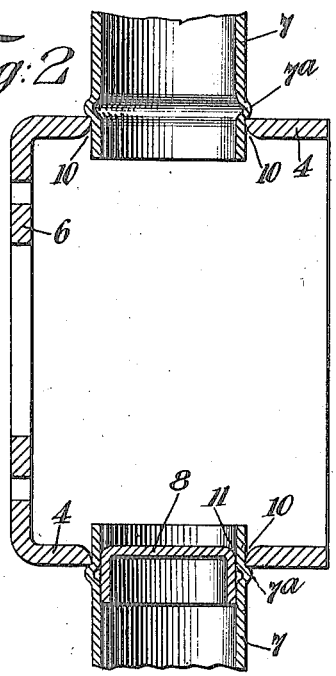
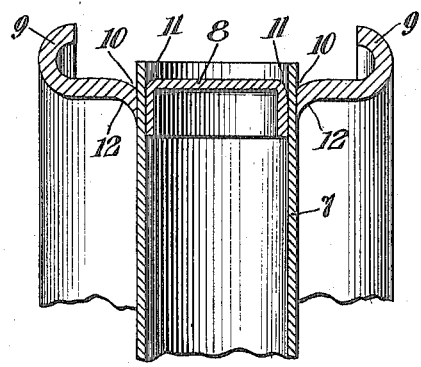
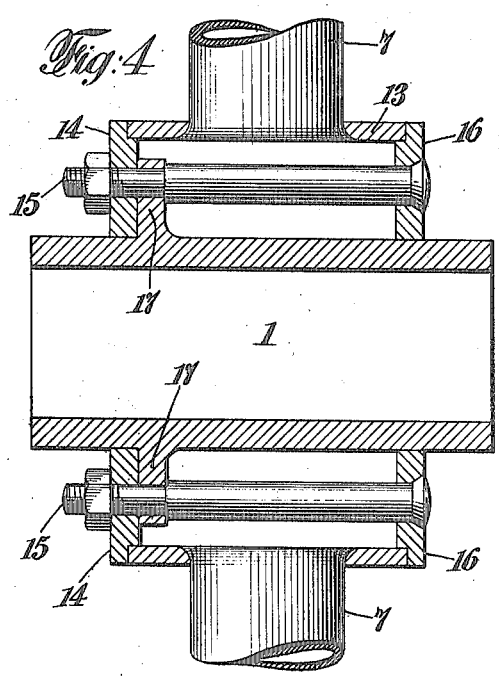
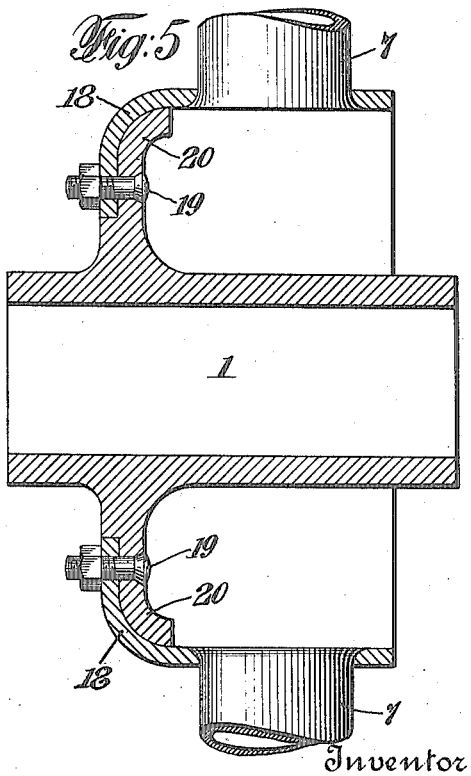

UNITED STATES PATENT OFFICE.

SETH G. MALBY, OF NEW YORK, N. Y.

WHEEL AND ITS MANUFACTURE.

1,255,195.        Specification of Letters Patent.        Patented Feb. 5, 1918.

Application filed July 17, 1916. Serial No. 109,657.

*To all whom it may concern:*

Be it known that I, SETH G. MALBY, a citizen of the United States, residing at the borough of Manhattan, in the county of New York and State of New York, have invented certain new and useful Improvements in Wheels and Their Manufacture, of which the following is a specification, reference being had therein to the accompanying drawings, forming part thereof.

This invention relates to wheels, such as automobile wheels, and the process of manufacturing them.

Simplicity, facility, economy, strength and reliability of the process and product, and facility in attaching and detaching the wheels from their bearings, are the objects of the invention.

The generic features of the invention are susceptible of adaptation in many specific constructions, several of which are illustrated in the accompanying drawings.

In the drawings:

Fig. 2 is a corresponding view of the hub-shell of Fig. 1, representing the spokes in different stages of the process of connecting them with the shell;

Fig. 3 is an axial sectional view of a spoke and the contiguous portion of the felly, and represents a modification in the method of joining the spokes to the felly or hub; and Figs. 4 and 5 are axial sectional views showing modifications in the hub construction.

Figure 1:
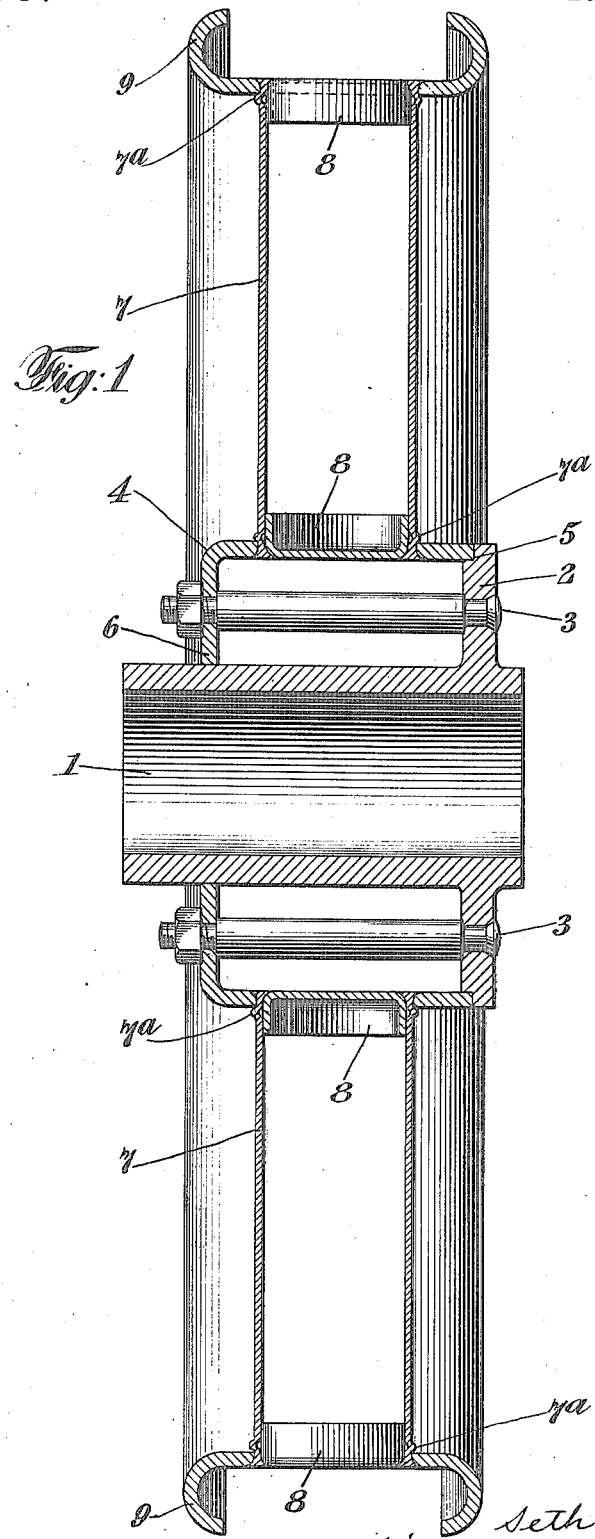
Figure 1 is an axial sectional view of a wheel embodying my invention.

In Fig. 1, the hub 1 is formed as a barrel adapted to be mounted upon a suitable axle by means of ball bearings, or other suitable bearings. The radial projection 2, which may be a spider or continuous flange, is in this instance formed integrally with the barrel 1 and drilled to receive the riveted ends of the bolts 3 which pass through the plane wall or bottom 6 of the cup-form hub-shell 4 and clamp the hub shell or cup firmly in position with its open cylindrical end or rim seated snugly in the shoulder cut at 5 upon the flange or spider and with the central aperture in its bottom wall fitting tightly over the hub barrel 1.

The spokes 7 are inserted through apertures formed in the cylindrical wall of the shell 4 and are welded therein in conjunction with the plugs 8, in a manner illustrated in Fig. 2; and the outer ends of the spokes are united in the same manner with the tire-clenching rim 9. The spoke-receiving apertures are flared or tapered on their edges as at 10 so that the apertures expand in the direction of spoke entry, and the plugs 8, which may be stamped and pressed in shallow cup form from sheet metal, are inserted into the spoke ends with their closed or flat sides outermost so that their rounded edges 11, together with the aperture flares 10, form annular recesses into which the spoke end may run and weld when it is fused by a torch or other suitable means. In order that the spoke end thus fused may fill this recess, it will preferably project before fusing some distance beyond the surfaces of the hub shell 4 and plug 8 which surfaces may be flush with each other. The finished weld may also be made flush by grinding or other dressing.

If desired circumferential ribs or ridges 7ª may be formed upon the spokes to abut the surfaces of the hub shell 4 and rim 9 as indicated. Fig. 1 shows the finished welded joints, while in Fig. 2 the upper spoke is shown before the hollow plug 8 has been inserted into its inner end connected with the hub shell, and the lower spoke is shown with the hollow plug inserted into its inner end which projects as aforesaid ready for welding. The spokes will of course be welded into the hub shell 4 before it is clamped upon the barrel and flange 1 and 2, the large open end of the shell 4 giving free access for the welding operation.

In service, the entire wheel is readily detachable from the barrel and flange by removing the nuts from the bolts 3. The hollow plugs 8 close the spokes hermetically, present a flush continuity of rim surface to support the pressure of a pneumatic tire, and strongly reinforce the hollow spokes at their junctures with the hub and felly.

In the construction of Fig. 3, the margin of the spoke-receiving aperture is turned up to form a short spoke-inclosing nipple, and the bend thus produced in the metal wall provides the annular channel 10 to receive the fused spoke-end. While this method is here shown as applied to the felly, it may as well be applied to the hub shell.

In the hub construction of Fig. 4 the hub shell is formed as a cylinder open at both ends and supported on spiders or annular disks 14 and 16 mounted on the hub-barrel 1. A flange or lugs 17 may be formed on the hub-barrel to carry bolts 15 by which the disk 14 may be secured as indicated; and when the disk 16 is not otherwise fastened upon the hub-barrel these bolts may be extended to retain it as shown. Manifestly either of the disks 14 or 16 could be made integral with the hub shell 13. In this drawing the spokes are shown without the ribs 7ª of Figs. 1 and 2.

In the construction of Fig. 5, the cylindrical hub shell has an integral inwardly curved flange 18 mounted by bolts 19 on a curved flange or spider 20 integrally formed on the hub-barrel 1, and the opposite end of the hub shell is left open to afford access for an interior expanding brake. Manifestly the hub-shell flange 18 might be made integral with the barrel flange 20 and barrel 1.

The welding flame or other welding means is applied to the spoke-ends within the hub shell and on the outer perimeter of the felly, which is a procedure of great advantage.

It will be noted that in Figs. 1, 4 and 5, the hub barrel 1 constitutes what may be termed an inner bearing member upon which the hub shell is mounted.

The foregoing description essays only several examples of the invention, while the following claims are formulated to define the invention in its broader scope, including its many specific forms of construction, some of which will be obvious to those versed in the art, and others of which may be inventively devised within the principles and spirit of the invention.

The invention in its broader aspects as defined in several of the claims is not limited to fusing projecting spoke ends as shown in Fig. 3. Any suitable welding process may be employed within the terms of the claims, such as flame welding and electric resistance and spot welding and electric arc welding.

The invention is defined in the following claims:

1. The process of connecting wheel spokes with a felly which consists in forming spoke-receiving apertures in a felly, inserting spokes through said apertures with their extremities projecting from the outer surface of the felly wall, and applying suitable fusing means to the spoke extremities to weld them to the felly.

2. The process of connecting wheel spokes with a hub shell which consists in forming spoke-receiving apertures in the hub shell, inserting spokes through said apertures with their extremities projecting from the inner surface of the hub shell, and applying suitable fusing means to the spoke extremities within the hub shell to weld them thereto.

3. The process of connecting wheel spokes with a felly or hub which consists in forming spoke-receiving apertures in a felly or hollow hub, inserting spokes into the apertures beyond the further surface of the hub or felly wall, and applying a fusing flame to said further surface and such projecting spoke-ends to weld the spokes to the hub or felly.

4. The process of connecting wheel spokes with a felly or hub which consists in forming spoke-receiving apertures in a felly or hollow hub, introducing the ends of hollow spokes into said apertures and plugs into said spoke ends to engage the spoke wall, and fusing said spoke ends until they weld to the felly or hub.

5. The process of connecting wheel spokes with a felly or hub which consists in forming spoke-receiving apertures in a felly or hollow hub, introducing the ends of hollow spokes into said apertures and plugs into said spoke ends, and fusing said spoke ends until they weld to the felly or hub and to their respective plugs.

6. The process of connecting wheel spokes with a felly or hub which consists in forming spoke-receiving apertures in a felly or hollow hub, inserting the ends of the spokes into said apertures with the spoke extremities projecting beyond the felly or hub wall, inserting plugs into said spoke ends to engage the spoke wall, and fusing said spoke ends to weld them to the felly or hub.

7. The process of connecting wheel spokes with a felly or hub which consists in forming flaring spoke-receiving apertures in a felly or hollow hub, introducing the ends of hollow spokes into the smaller orifices of said apertures and plugs into said spoke ends, and fusing said spoke ends until they weld to the felly or hub.

8. The process of connecting wheel spokes with a hub or felly which consists in forming flaring spoke-receiving apertures in the hub or felly wall, introducing the ends of hollow spokes into the smaller orifices of said apertures with the spoke extremities projecting beyond the hub or felly wall, introducing plugs into said spoke ends, and fusing said spoke ends until they weld to the hub or felly.

9. The process of connecting wheel spokes with a hub or felly which consists in forming flaring spoke-receiving apertures in the hub or felly wall, introducing the ends of hollow spokes into the smaller orifices of said apertures with the spoke extremities projecting beyond the hub or felly wall, introducing plugs into said spoke ends, and fusing said spoke ends until they weld to the hub or felly and to their respective plugs.

10. The process of connecting wheel spokes to a hub or felly which consists in forming spoke-receiving apertures in the hub or felly wall, introducing the ends of hollow spokes into said apertures, introducing plugs into the spoke ends and flush with the wall of the hub or felly, and fusing the spoke ends to their plugs and to the hub or felly wall.

11. The process of connecting wheel spokes to a hub or felly which consists in forming spoke-receiving apertures in the hub or felly wall, introducing the ends of hollow spokes into said apertures with the spoke extremities extending beyond the hub or felly wall, introducing plugs into the hollow spoke ends with the plug surfaces flush with the wall of the hub or felly, and fusing the spoke extremities to weld them to their plugs and to the wall of the hub or felly.

12. A wheel comprising hub and felly members and hollow spokes suitably connected with one of said members and secured in spoke-receiving apertures in the second of said members, and cup-shaped plugs consisting in circumferential sides extending from the periphery of the cup bottom and inserted in the spoke ends connected with said second member with the cup bottoms outwardly presented and their circumferential sides projecting toward the spoke interiors.

13. A wheel comprising hub and felly members and hollow spokes suitably connected with one of said members and welded in spoke-receiving apertures in the second of said members, and cup-shaped plugs consisting in circumferential sides extending from the periphery of the cup bottom and welded in the spoke ends connected with said second member and with the cup bottoms outwardly presented and their circumferential sides projecting toward the spoke interiors.

14. A wheel comprising a felly, a hub member formed with an annular shell which is open at an orifice of substantially the full inside annular shell diameter, and spokes connected with the felly and the annular shell wall, and a closure for said shell orifice, and an inner bearing member upon which the hub member is mounted.

15. A wheel comprising a felly, an annular hub shell formed with at least one end open in an orifice having substantially the full inside annular shell diameter, spokes connected with the felly and the annular wall of the hub shell, an inner bearing member, and means securing the hub shell thereon.

16. A wheel comprising a felly, an annular hub shell formed with at least one end open in an orifice having substantially the full inside annular shell diameter, spokes connected with the felly and the annular wall of the hub shell, an inner bearing member, and means for closing the hub shell and securing it on the inner bearing member.

17. A wheel comprising a felly, a hollow annular hub formed with at least one end open in an orifice having substantially the full inside annular hub diameter, spokes connected with the felly and the annular hub wall, and end closures for the hub at least one of which is detachably secured thereto.

18. A wheel comprising a felly, a hub member formed with an annular shell portion open at an orifice having substantially the full inside annular shell diameter, spokes connecting the felly with the annular shell wall of the hub member, an inner bearing shaft with a radial projection, and means for securing the first said hub member to said bearing projection.

19. A wheel comprising a felly, a cup-form hub-shell having annular sides projecting from the cup bottom, spokes connecting the felly with the annular wall of the hub-shell, an inner bearing member, and means for securing the bottom of the cup-form hub-shell thereto.

20. A wheel comprising a felly, a cup-form hub-shell, spokes connecting the felly with the annular wall of the cup-form hub-shell, an inner bearing member with a radial projection, and means for connecting said radial projection with the bottom wall of the cup-form hub-shell.

21. A wheel comprising a felly, a cup-form hub-shell, spokes connecting the felly and annular wall of said cup-form, a flanged bearing shaft, and means for connecting its flange with the bottom wall of the said cup-form hub-shell.

22. A wheel comprising a felly, a cup-form hub-shell with a centrally perforated bottom, spokes connecting the felly and the annular wall of said cup-form, an inner shaft passing through said central perforation in the cup-form bottom and having a radial projection, and means for connecting said radial projection with the cup-form bottom to secure the hub-shell and shaft together.

23. A wheel comprising a felly, a cup-form hub-shell, spokes connecting its annular wall with the felly, a flanged shaft, and means for securing it to the hub-shell with its flange closing the cup-form opening.

24. A wheel comprising a felly, a hub member integrally formed as a cylindrical cup with a central perforation in its bottom, spokes connecting the felly with the cylindrical wall of the cup or hub member, and a flanged barrel whose flange is secured to the cup rim and whose tubular part passes through the central perforation in the cup bottom.

25. A wheel comprising a felly, a hub member integrally formed as a cylindrical cup with a central perforation in its bottom, spokes connecting the felly with the cylindrical wall of the cup or hub member. a flanged barrel whose flange abuts the cup rim and whose tubular portion passes through the central perforation in the cup bottom, and tie members connecting the cup bottom and the said barrel flange.

26. The process of connecting hollow wheel-spokes with a felly or hub which consists in forming spoke-receiving apertures in the felly or hub, and welding the hollow spoke ends into said apertures and plugs into said spoke ends.

27. The process of connecting hollow wheel-spokes with a felly or hub which consists in forming spoke-receiving apertures in the felly or hub and welding the hollow spoke ends in said apertures with reinforcing plugs inserted in said spoke ends flush with the surface of the felly or hub.

28. A wheel comprising hub and felly members and spokes suitably connected with one of said members and having hollow ends welded in apertures in the other member, and reinforcing plugs secured in said hollow spoke ends.

29. A wheel comprising hub and felly members and spokes suitably connected with one of said members and having hollow ends welded in apertures in the other member, and reinforcing plugs welded in said hollow spoke ends.

30. A wheel comprising hub and felly members and spokes suitably connected with one of said members and having hollow ends welded in flaring apertures in the other member which apertures flare or diverge in the direction of spoke entry, and reinforcing plugs welded in said hollow spoke ends.

31. A wheel comprising hub and felly members and spokes suitably connected with one of said members and having hollow ends welded in apertures in the other member, and plugs secured in said hollow spoke ends and flush with the surface of said other member.

32. A wheel comprising hub and felly members and spokes suitably connected with one of said members and having hollow ends welded in apertures in the other member, and plugs welded in said hollow spoke ends and flush with the surface of said other member.

33. The process of connecting hollow wheel-spokes with a felly or hub which consists in forming spoke-receiving apertures in the felly or hub and welding the hollow spoke ends in said apertures with cup-shaped reinforcing plugs inserted in said spoke ends with their cup bottoms flush with the surface of the felly or hub.

34. The process of connecting hollow wheel-spokes with a felly or hub which consists in forming spoke-receiving apertures in the felly or hub and inserting cup-shaped reinforcing plugs into the hollow spoke ends with their cup bottoms flush with the surface of the felly or hub and welding said spoke ends in said apertures and to said plugs.

35. A wheel comprising hub and felly members and spokes suitably connected with one of said members and having hollow ends welded in apertures in the other member, and cup-shaped plugs secured in said hollow spoke ends and with their cup bottoms flush with the surface of said other member.

36. A wheel comprising hub and felly members and spokes suitably connected with one of said members and having hollow ends welded in apertures in the other member, and cup-shaped plugs welded in said hollow spoke ends and with their cup bottoms flush with the surface of said other member.

In testimony whereof I have affixed my signature.

SETH G. MALBY.